(12) United States Patent
Shimada et al.

(10) Patent No.: US 6,414,844 B1
(45) Date of Patent: Jul. 2, 2002

(54) PORTABLE INFORMATION PROCESSING APPARATUS

(75) Inventors: Isao Shimada, Kakogawa; Hideki Harada, Kobe; Junichi Kubota, Mino-gun; Akihiro Kuranaga, Kobe, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 40 days.

(21) Appl. No.: 09/654,510

(22) Filed: Sep. 1, 2000

(30) Foreign Application Priority Data

Sep. 3, 1999 (JP) .......................................... 11-250021

(51) Int. Cl.[7] .................................................. H05K 7/04
(52) U.S. Cl. .................... 361/687; 361/694; 361/695; 361/688; 312/282; 312/314; 248/636; 211/26
(58) Field of Search ................................ 361/687, 695, 361/683, 694, 680, 736, 688; 312/282, 314, 316, 107; 248/636; 211/26

(56) References Cited

U.S. PATENT DOCUMENTS 5,793,609 A * 8/1998 Donahoe et al. ............ 361/695
5,923,530 A * 7/1999 Murayama et al. .......... 361/687
6,040,977 A * 3/2000 Hoffer ........................ 361/680
6,049,455 A * 4/2000 Nakamura et al. .......... 361/688
6,278,607 B1 * 8/2001 Moore et al. ............... 361/687

FOREIGN PATENT DOCUMENTS

JP          02000112572 A  *  4/2000

* cited by examiner

*Primary Examiner*—Darren Schuberg
*Assistant Examiner*—David Foster
(74) *Attorney, Agent, or Firm*—Wenderoth, Lind & Ponack, L.L.P.

(57) ABSTRACT

A portable information processing apparatus is configured to dissipate heat generated in a cabinet mainly from a part which a user hardly touches, and thus the temperature at a palm rest is suppressed. The cabinet includes a heat conducting spacer 16 provided over a heat-generating component 15 to conduct heat thereof, a heat absorption area 10ah to absorb the heat of the heat-generating component 15 through the heat conducting spacer 16, and a heat conduction obstructing area 10rb provided on a heat conduction path between the heat absorption area 10ah and the palm rest 11 to reduce a cross-sectional area of the heat conduction path. Accordingly, heat conduction from the high-temperature heat generating component 15 to the palm rest 11 is restricted, and thus the temperature of the palm rest 11 can be limited.

9 Claims, 6 Drawing Sheets

PORTABLE INFORMATION PROCESSING APPARATUS

BACKGROUND OF THE INVENTION

1. Field of the Invention

The present invention relates to a portable information processing apparatus such as a notebook PC, a cabinet of which is made of lightweight material superior in heat conductivity, typified by magnesium alloy, for example.

2. Description of the Background Art

For a portable information processing apparatus typified by a notebook PC, goals of higher-performance, lower-profile, and lighter-weight have been diligently pursued. The key to higher-performance is a CPU (Central Processing Unit) capable of higher-speed processing and a more highly-integrated circuit. And the key to lower-profile and lighter-weight is a lightweight metal such as magnesium alloy, which does not impair the cabinet strength.

Since such a highly-capable CPU and a highly-integrated circuit generate much heat to raise their own temperature and surroundings' to a higher degree, an issue here is how effectively the heat is dissipated into the air through the cabinet made of the lightweight material such as magnesium alloy.

With reference to FIGS. 9 and 10, described below is the structure of a conventional portable information processing apparatus, and a heat dissipation method. A portable information processing apparatus PIc1 mainly includes a cabinet 20, a palm rest 21, a display 22, a keyboard 23, a CPU 25, a cooling fan 27, and flat pad 29.

The cabinet 20 is made of metal. The lower-front thereof is the palm rest 21, where a user puts his/her hands to tap keyboard. Found approximately in the center of the palm rest 21 is the flat pad 29, which is a pointing device. The keyboard 23 is placed on the upper part of the cabinet 20, and the display 22 is hinged to the cabinet 20 in a swivel manner.

In the cabinet 20, placed beneath the keyboard 23 is a circuit board 24 having the CPU 25 mounted thereon. Since the CPU 25 itself heats up, a dissipator 28 is placed thereover so as not to abut the cabinet 20. The dissipator 28 is partially in contact with the cooling fan 27. With such configuration, even if the dissipator 28 is heated due to the CPU 25, the heat is dissipated by the cooling fan 27 so that the temperature in the cabinet is kept constant.

In order to adequately cool the heat source, i.e., CPU 25, in the portable information processing apparatus PIc1, the dissipator 28 has to be increased in area and volume for effective heat absorption. Moreover, the cooling fan 27 has to be increased in power for swift heat dissipation so as to improve absorption efficiency of the dissipator 28. The problem here is, if a motor of the cooling fan 27 is increased in speed, noise level and power consumption are both increased.

To get around such problem resulting from the cooling fan 27, the structure of a portable information processing apparatus PIc2 and heat dissipation method are briefly described by referring to FIGS. 11 and 12. Herein, heat generated in the cabinet 20 is intended to go through the cabinet 20 before being dissipated. Specifically, the cabinet 20 is a functional substitute for the dissipator 28, and absorbs the heat of the CPU 25 from the inner surface thereof and then dissipates the heat from the outer surface thereof to internally cool off.

However, the heat absorbed from the inner surface of the cabinet 20 is conducted and resultantly heats the entire cabinet 20 to such degree that the user feels uncomfortable. At such degree, if the user puts his/her hands on the palm rest 21 for a long time, he/she may suffer low-temperature burns. In the above, the cabinet 20 is assumed to functionally substitute for the dissipator 28. However, even if the cabinet 20 and the dissipator 28 are separately provided as in the portable information processing apparatus PIc1, the heat of the CPU 25 is conducted to the cabinet 20 through the dissipator 28, and thus the cabinet 20 is heated beyond the allowable temperature.

SUMMARY OF THE INVENTION

The present invention has the following features to attain the objects above.

A first aspect of the present invention is directed to a portable information processing apparatus in which heat conduction from a high-temperature heat-generating component in a cabinet to a palm rest, which is a surface of the cabinet, is restricted, and the temperature of the palm rest is controlled to be no higher than a predetermined temperature, the device comprising:

a heat conducting spacer provided over the heat-generating component to conduct heat thereof;

a heat absorption area being a part of the cabinet absorbs the heat of the heat-generating component through the heat conducting spacer; and a heat conduction obstructing area provided on a heat conduction path between the heat absorption area and the palm rest to reduce a cross-sectional area of the heat conduction path.

As described above, in the first aspect, the temperature of the palm rest can be controlled to be no higher than a predetermined temperature.

According to a second aspect, in the first aspect, the cabinet is made of lightweight metal superior in heat conductivity and strength.

According to a third aspect, in the first aspect, a cooling fan is provided beneath the heat absorption area in a rather upper position of the cabinet, and dissipates the heat from the heat absorption area to outside of the cabinet.

According to a fourth aspect, in the first aspect, the heat blocked by the heat conduction obstructing area on the way to the palm rest is dissipated from surroundings of the heat conduction obstructing area.

According to a fifth aspect, in the first aspect, an outer surface of the palm rest is subjected to heat insulation.

As described above, in the fifth aspect, the temperature at the palm rest can be suppressed to a greater extent.

According to a sixth aspect, in the fifth aspect, the heat insulation is a thick coating including hollow spheres.

According to a seventh aspect, in the sixth aspect, the heat insulation is a film made of resin.

According to an eighth aspect, in the second aspect, the lightweight metal is selected from a lightweight metal group typically including aluminum and magnesium.

According to a ninth aspect, in the first aspect, the heat conduction obstructing area has one or more through holes formed along the heat conduction path.

As described above, in the ninth aspect, the palm rest can be controlled in temperature without any special device.

According to a tenth aspect, in the first aspect, a cross-sectional area of the heat conduction obstructing area is smaller in size than that of the heat absorption area and the palm rest.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
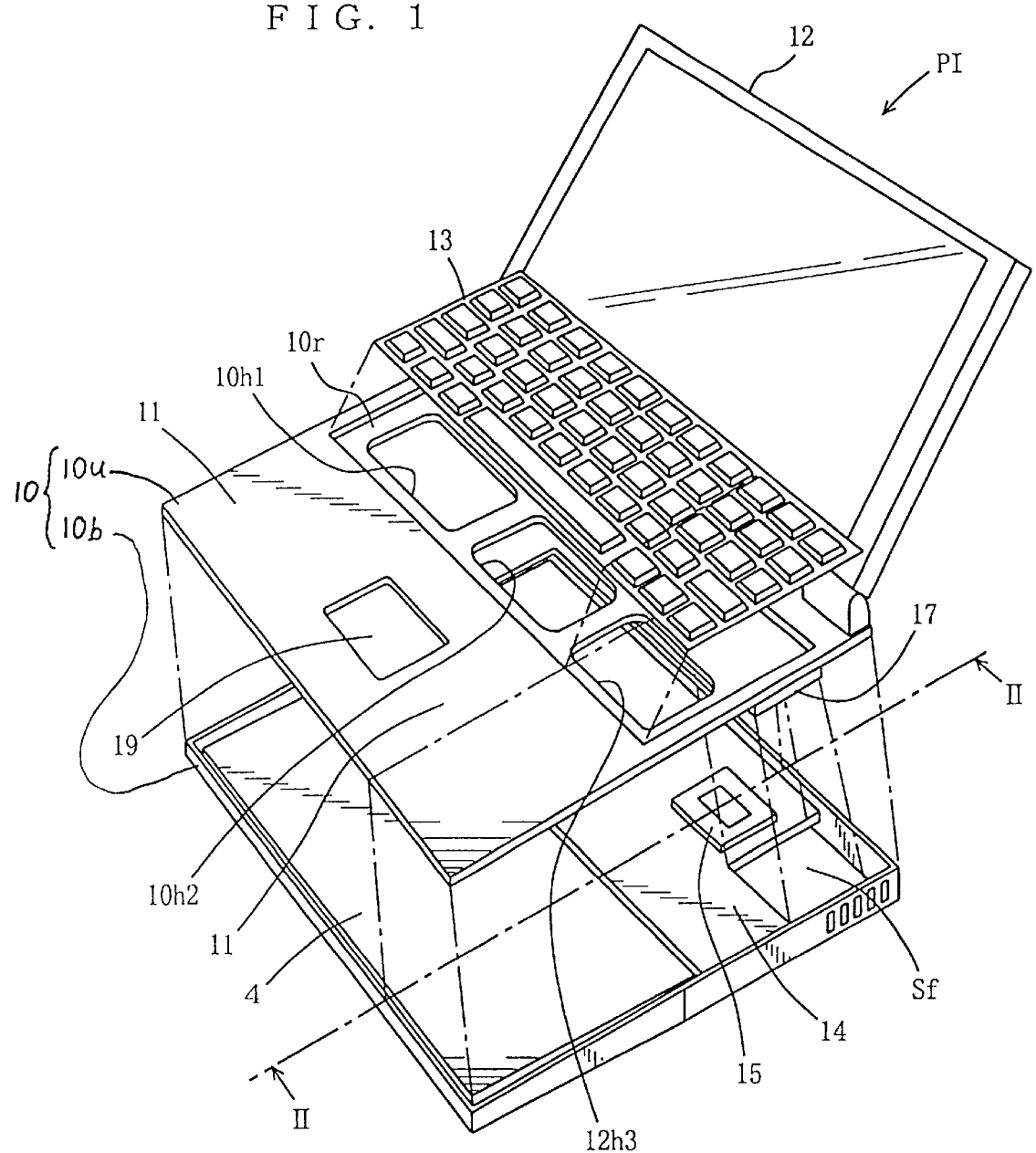
FIG. 1 is a perspective developed view of a portable information processing apparatus according to an embodiment of the present invention.
Figure 2:
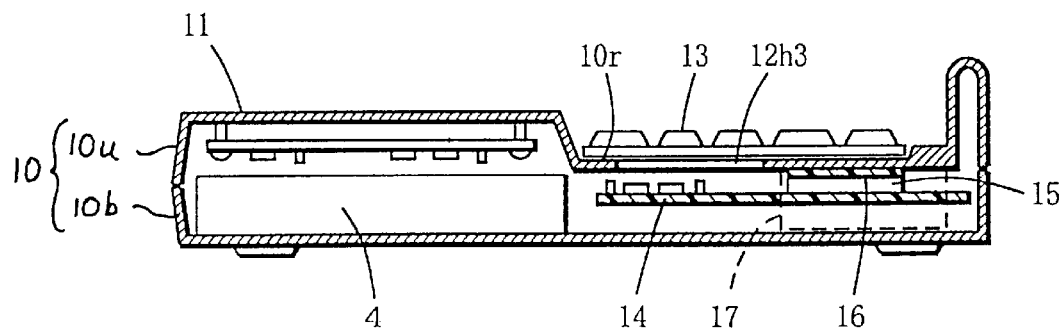
FIG. 2 is a sectional view of the portable information processing apparatus taken along a line II—II in FIG. 1.

By referring to FIGS. 1 and 2, described first is the basic structure of an information processing apparatus of the present invention. Thereafter, by referring to FIGS. 3 and 4, the structure of a cabinet thereof is described in detail and then with reference to FIGS. 5, 6, 7 and 8, an exemplary modification of the cabinet is described.

An information processing apparatus PI of this embodiment mainly includes a cabinet 10, a palm rest 11, a display 12, a keyboard 13, a CPU 15, a cooling fan 17, and a flat pad 19. The cabinet 10 is formed in a rectangular shape, and made of metal superior to resin in strength and heat conductivity. The cabinet 10 is composed of an upper case 10u and a lower case 10b. The display 12 is hinged to upper ends of the upper case 10u in a swivel manner.

Housed in a concave which occupies the upper-half on the inner surface of the lower case 10b is a circuit board 14, on which circuit components (partially shown) including the CPU 15, which is the heat source, are mounted. As is clearly shown in FIG. 1, an upper-right end of the circuit board 14 is cut into a square, forming a space Sf between the circuit board 14 and the lower case 10b. Housed in a lower-half of the lower case 10b are various devices 4 such as a disk drive.

The upper-half on the outer surface of the upper case 10u is a recess 10r, which corresponds to the outside shape of the keyboard 13. The keyboard 13 is accommodated therein. The lower-half of the recess 10r is a heat conduction obstructing area 10rb (FIG. 3) having one or more through holes 10h therein, and heat conduction is obstructed thereby. The upper-half of the recess 10r is a heat conduction area 10ra (FIG. 3) having no through hole 10h.

Once the upper and lower cases 10u and 10b are combined together, the heat conduction area 10ra abuts the CPU 15 on the circuit board 14 via a heat conducting member 16, and absorbs and conducts the heat of the CPU to the surroundings. From this view point, in the heat conduction area 10ra, an area where the heat of the CPU 15 is absorbed through the heat conducting member 16 is referred to as a heat absorption area 10ah. The heat conducting member 16 may be film, grease, or a combination thereof so long as the heat conducting member 16 electrically insulates, yet conducts heat.

Found beneath the heat conduction area 10ra is the cooling fan 17. The cooling fan 17 is so placed as to fit in the space Sf when the upper and lower cases 10u and 10b are combined together to complete the cabinet 10.

The lower-half of the outer surface of the upper case 10u, i.e., the part lower than the recess 10r, is the palm rest 11 on which the user puts his/her hands. Found approximately in the center of the palm rest 11 is the flat pad 19, which is a pointing device. The palm rest 11 is coated with a heat-resistant material including hollow spheres with a thickness of about 200 μm.

With the cabinet 10 assembled, the heat of the CPU 15 is conducted to the heat absorbing area 10ah of the upper case 10u through the heat conducting member 16, and then absorbed. The heat is then partially dissipated forcefully by the cooling fan 17 placed in the space Sf. The residual heat not dissipated by the cooling fan 17 is conducted to the heat conduction area 10ra from the heat absorbing area 10ah, and warms the cabinet 10 in its entirety. The heat is then dissipated from the outer surfaces of the cabinet 10.

In the present invention, the heat conduction region 10ra (heat absorption area 10ah) and the palm rest 11 are connected to each other via the heat conduction obstructing area 10rb. The heat conduction obstructing area 10rb successfully suppresses heat conduction from the heat conduction area 10ra to the palm rest 11 with the one or more through holes 10h formed therein.

This is because the area allowed for heat conduction between the heat conduction area 10ra (heat absorption area 10ah ) and the palm rest 11 is quite limited to narrow path(s) formed between the holes, if plural, and end parts of the recess 10r. Herein, since the through hole 10h retains air which is low in heat conductivity, the amount of heat reaching the palm rest 11 through the hole 10h is small and negligible in this invention. Therefore, the cross-sectional area of the heat conduction obstructing area 10rb capable of heat conduction is significantly smaller compared with other parts of the cabinet 10 such as the heat conduction area 10ra, and thus heat conduction can be effectively obstructed.

In other words, the heat conduction obstructing area 10rb obstructs heat conduction to the palm rest 11. As a result, the overall amount of heat reaching the palm rest 11 from the heat conduction area 10ra is reduced, thereby suppressing the temperature at the palm rest 11. The heat blocked by the heat conduction obstructing area 10rb is dissipated into the air from the outer surface, especially from the outer surface over the heat conduction area 10ra, of the upper case 10u. Therefore, the portable information processing apparatus PI can be entirely cooled off with the temperature at the palm rest 11 suppressed, and moreover, the load to be imposed on the cooling fan can be lessened.

Figure 3:
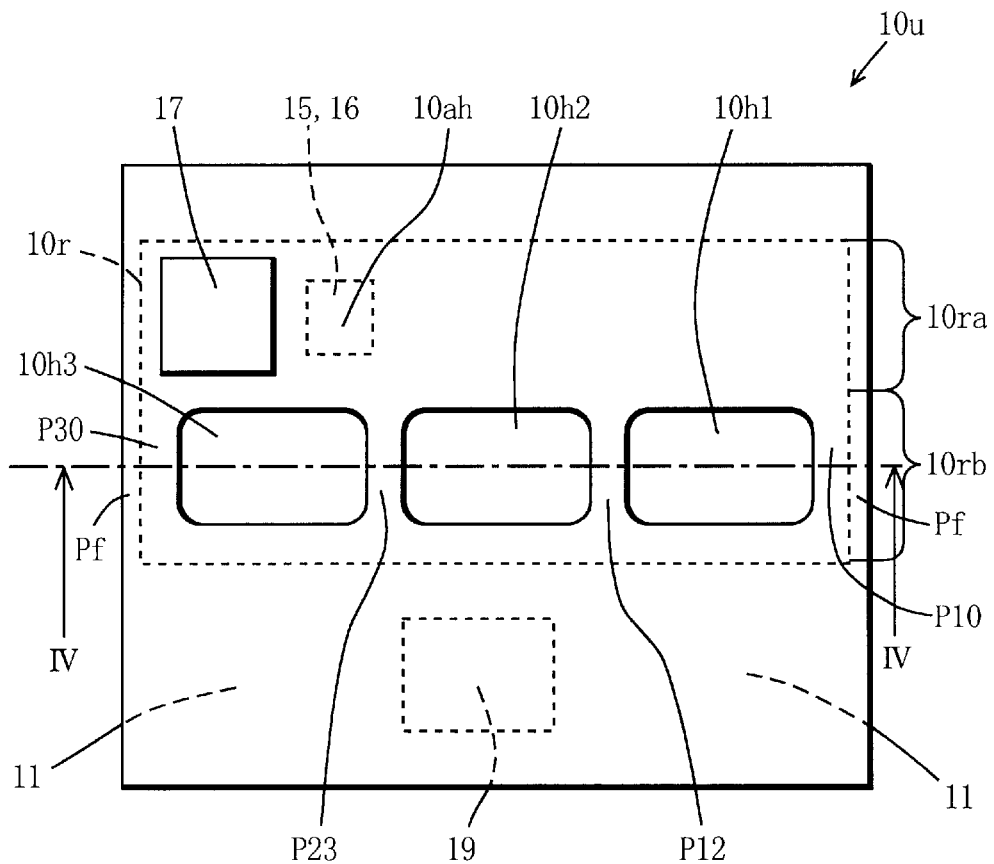
FIG. 3 is a plan view showing an inner surface of an upper case of the portable information processing apparatus of FIG. 1.
Figure 4:
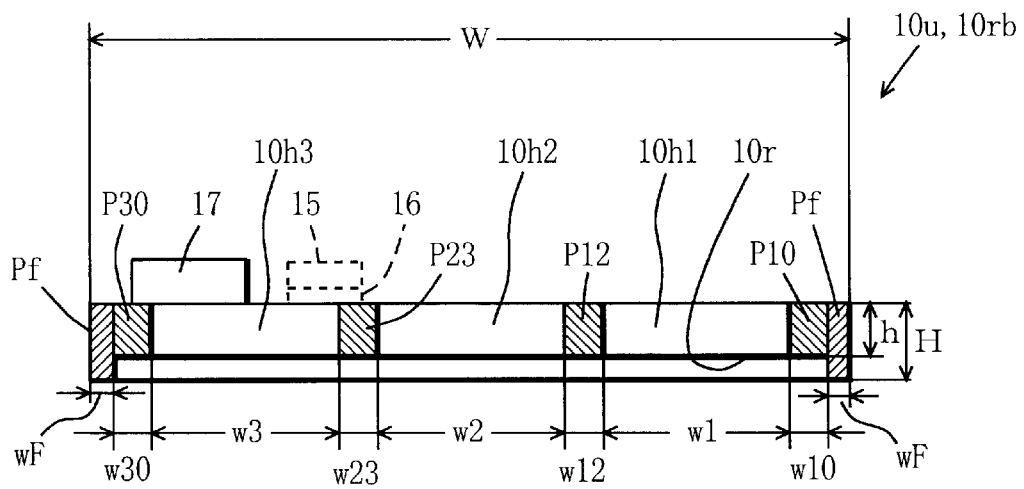
FIG. 4 is a sectional view of the upper case taken along a line IV—IV in FIG. 3.

Next, by referring to FIGS. 3 and 4, the above-described heat conduction obstructing area 10rb is described in detail. Depicted in FIG. 3 is a plan view of an inner surface of the upper case 10u. The heat absorption area 10ah abutting the heat conducting member 16 in the heat conduction area 10ra is heated by the CPU 15. As a result, in the upper case 10u, there will be a thermal-gradient between the heat absorption area 10ah and other areas. Then the heat starts to conduct radially from the heat absorption area 10ah outward.

Herein, the heat is radially conducted also from the outer surface of the upper case 10u, and the heat is dissipated due to air convection therefrom. Such heat dissipation, however, has no direct bearing on the temperature at the palm rest 11, which is the issue of the present invention, and thus is not described here.

Considered next is a process of heat conduction from the highly-heated heat absorption area 10ah to the palm rest 11. As already described, the heat of the heat absorption area 10ah is radially conducted through the upper case 10u. In detail, the longer a heat conduction path, the lower the temperature at a destination of the heat becomes. This is because the heat can dissipate to a greater extent through the upper case 10u in its course. Further, with the heat dissipated, an area where the heat is exposed to air, i.e., a heat dissipation area, becomes larger. As is known from this, key factors for the lower temperature is the longer heat conduction path and the larger heat dissipation area.

In consideration of such key factors, in the present invention, a through hole 10h3 is provided on a line extending between the heat absorption area 10ah and the palm rest 11 so as to reduce the cross-sectional area for heat conduction. With the through hole 10h3, the heat from the heat absorption area 10ah is blocked on the way to the palm rest 11, and thus detours via conduction paths P30 and P23 on both sides of the through hole 10h3.

As shown in FIG. 4, if the through hole 10h3 is not provided, the cross-sectional area for the part is expressed by (w30+w3+w23)×h. On the other hand, the cross-sectional area with the through hole 10h3 is expressed by (w30+w23)×h. That is, the through hole 10h3 reduces the cross-sectional area for heat conduction to (w30+w23)/(w30+w3+w23).

Similarly, if through holes 10h1 and 10h2 are provided together with the through hole 10h3, the cross-sectional area for the heat conduction obstructing area 10rb is reduced to (w10+w12+w23+w30)/W in its entirety.

Without heat dissipation from outer the surface considered, a total amount of heat conduction is approximately proportional to the cross-sectional area for heat conduction. Therefore, in this embodiment, the total amount of heat reaching the palm rest 11 from the heat absorption area 10ah is reduced according to a function of f((w10+w12+w23+w30)/W). In other words, the average temperature at the palm rest 11 is decreased according to a function of f((w10+w12+w23+w30)/W).

Figure 5:
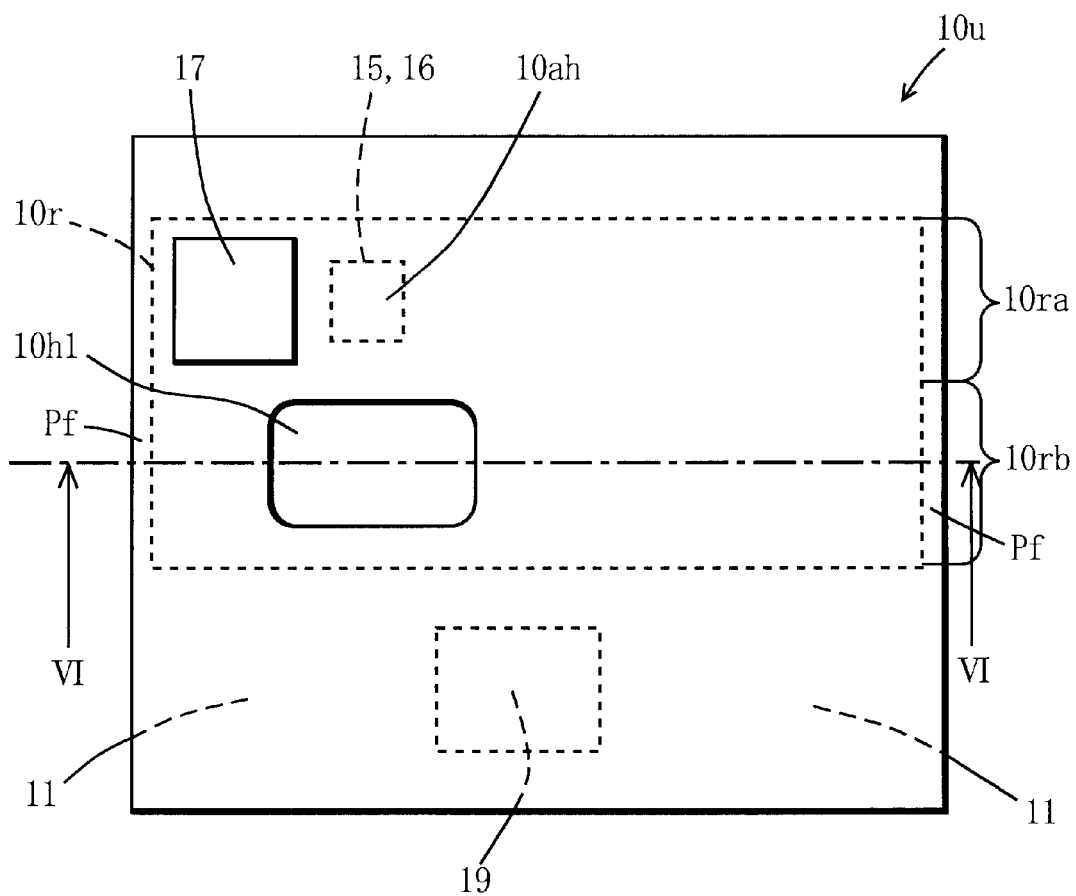
FIG. 5 is a plan view showing a modification of an upper case 10 shown FIG. 1.
Figure 6:
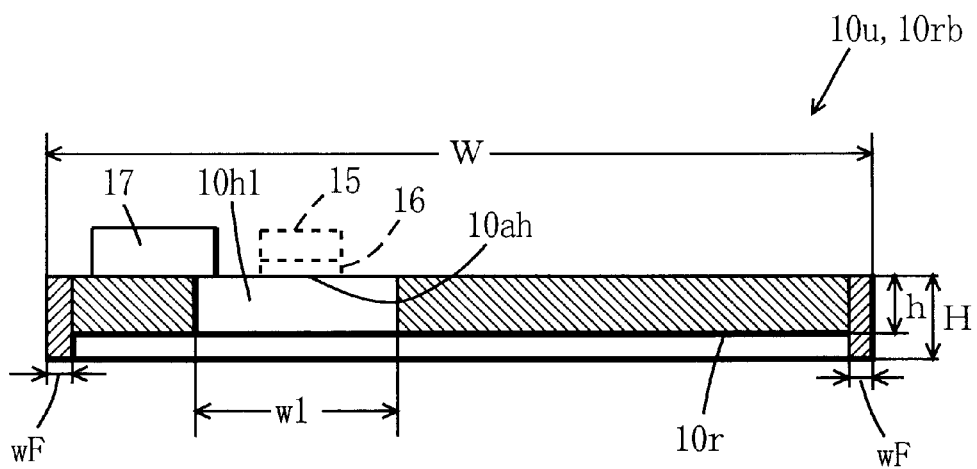
FIG. 6 is a sectional view of the upper case taken along a line of VI—VI in FIG. 5.

Described next is an exemplary modification of the heat conduction obstructing area 10rb by referring to FIGS. 5 and 6. The heat conduction obstructing area 10rb shown in FIGS. 3 and 4 is provided with three through holes 10h1 to 10h3. In the heat conduction obstructing area 10rb for this modification, however, only the through hole 10h1 is provided on a line in the shortest distance between the heat absorption area 10ah and the palm rest 11.

This configuration works well for a case where the heat absorption area 10ah does not get so hot. With the through hole 10h1 provided on the way to the palm rest 11, the heat conduction path between the heat absorption area 10ah and the palm rest 11 is lengthened, and thus the palm rest 11 is prevented from becoming high in temperature. In such case, the total amount of heat reaching the palm rest 11 from the heat absorption area 10ah is reduced according to a function of f((W−w1)/W).

Figure 7:
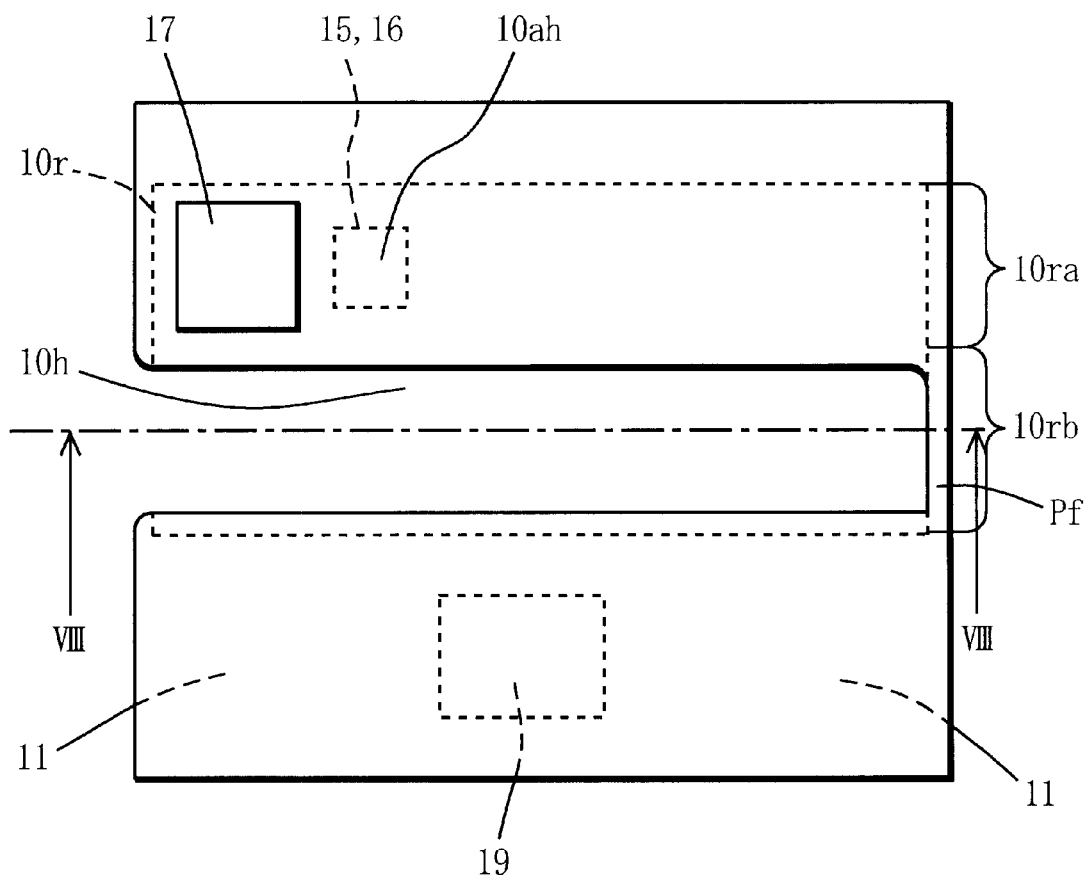
FIG. 7 is a plan view showing another modification of the upper case 10 shown in FIG. 1.
Figure 8:
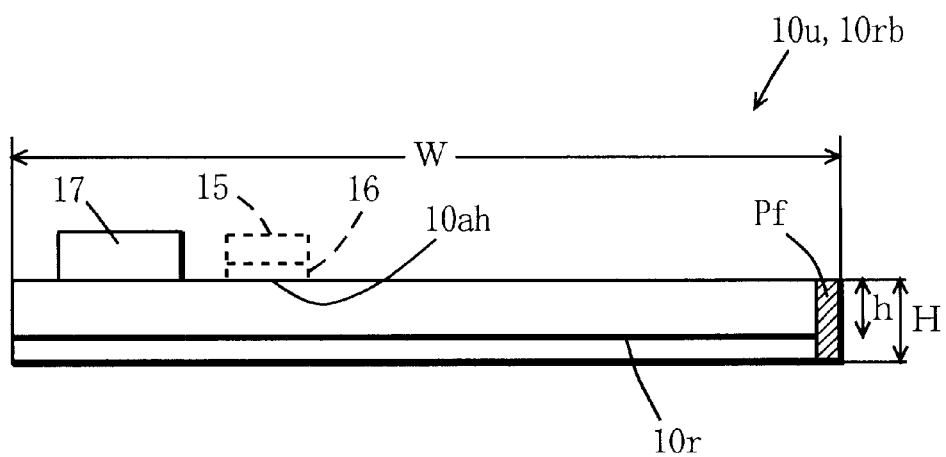
FIG. 8 is a sectional view of the upper case taken along a line of VIII—VIII in FIG. 7.
Figure 9:
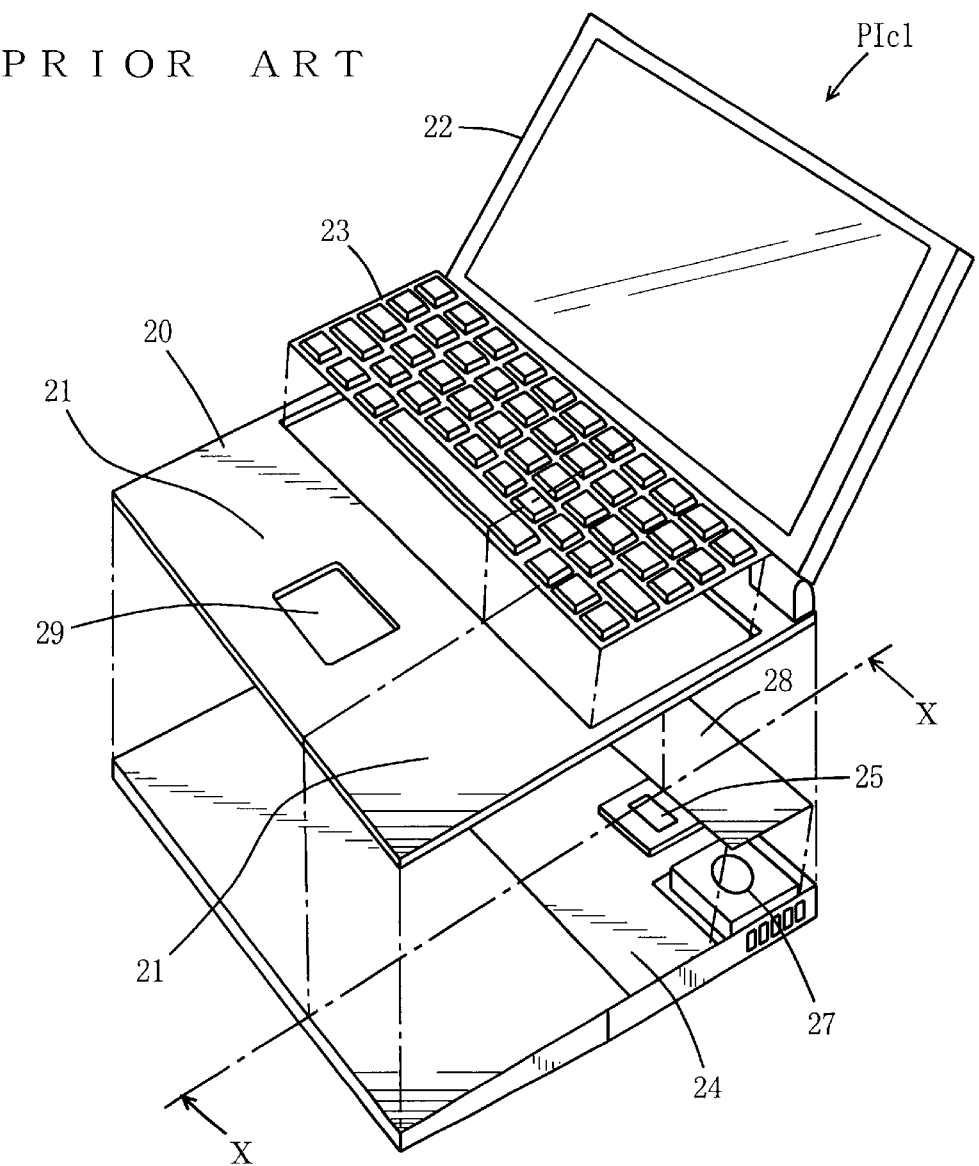
FIG. 9 is a perspective developed view of a conventional portable information processing apparatus.
Figure 10:
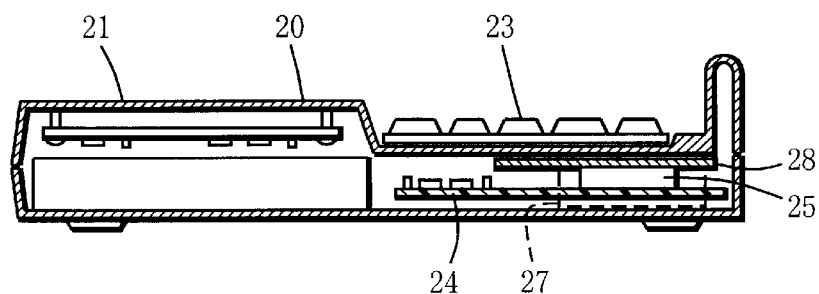
FIG. 10 is a sectional view of the portable information processing apparatus taken along a line X—X in FIG. 9.
Figure 11:
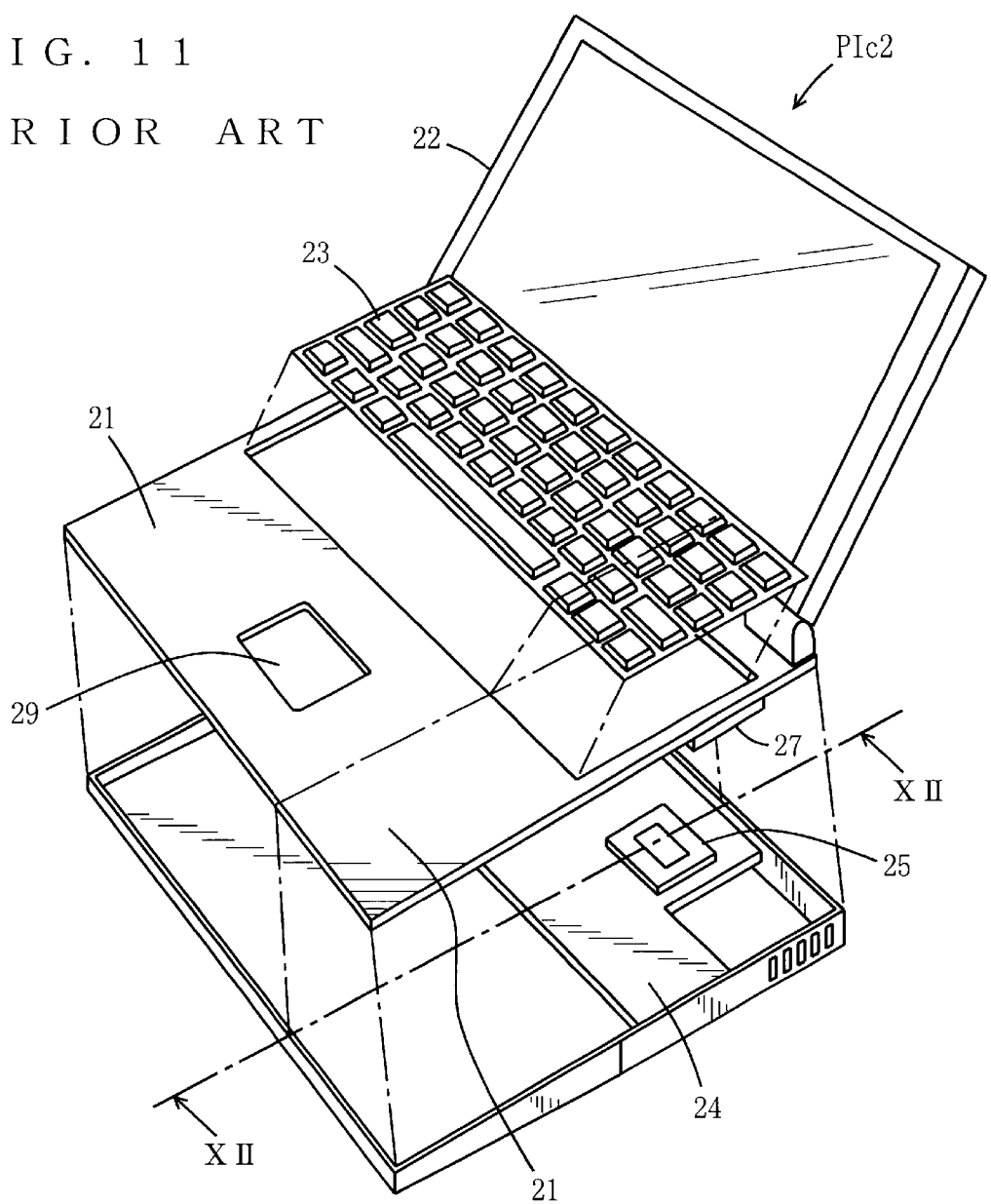
FIG. 11 is a perspective developed view of another conventional portable information processing apparatus.
Figure 12:
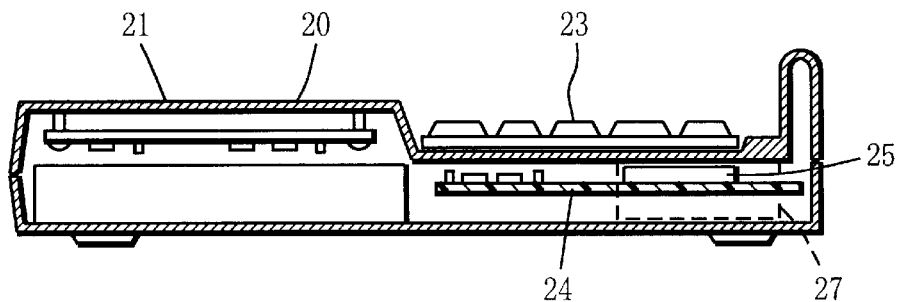
FIG. 12 is a sectional view of the portable information processing apparatus taken along a line XII—XII in FIG. 11.

Described next is another exemplary modification of the heat conduction obstructing area 10rb by referring to FIGS. 7 and 8. As in the heat conduction obstructing area 10rb described with reference to FIGS. 5 and 6, the heat conduction obstructing area 10rb for this modification is also provided only with the through hole 10h1. However, the size of the through hole 10h1 herein is much larger and covers almost the full range of the heat conduction obstructing area 10rb. In such case, the heat of the heat absorption area 10ah has to travel all the way to a far end Pf of the recess 10r to reach the palm rest 11. Accordingly, the heat conduction path is significantly lengthened. The cross-sectional area for heat conduction is expressed by wF×H. The temperature at the palm rest 11 is thus reduced according to a function of f((wF×H/W×h+2wF×H). This configuration works well for a case where the heat absorption area 10ah is very high in temperature.

As is known from the above, in the upper case 10u of the present invention, the heat conduction obstructing area 10rb is configured with the through hole(s) 10h made between the heat absorption area 10ah and the palm rest 11 or by reducing the thickness thereof. Accordingly, the palm rest 11 and the flat pad 19 located close to the keyboard 13 are both less heated due to the heat coming from the heat absorption area 10ah, and thus the temperature thereof can be suppressed.

Additionally, a thick coating of hollow spheres over the palm rest 11, for example, works effectively for the part to not feel so hot when the user is tapping the keyboard. A sheet exemplarily made of resin low in heat conductivity also works well for this purpose.

As to the cooling fan 17, the location thereof preferably is on the inner surface of the upper case 10u, in the vicinity of the heat source CPU 15, and so that it does not block the through hole(s) 10h. Herein, a copper board or a heat pipe may improve the cooling fan 17 in its efficiency if attached on the inner surface of the upper case 10u between the cooling fan 17 and the CPU 15.

As is obvious from the above, the information processing apparatus of the present invention is capable of heat dissipation from the rear thereof to a greater extent than the conventional one, and accordingly the amount of heat dissipated therefrom is increased. Further, with a plurality of through holes provided on the heat conduction path between the heat-generating component and the palm rest 11, the heat conduction to the palm rest 11 on which the user puts his/her hands is suppressed. Still further, a thick coating of hollow spheres over the palm rest 11 helps so that the part does not feel so hot when the user is tapping the keyboard. Accordingly, the user's use environment is kept pleasant for a long period of use without any danger of low-temperature burns, for example.

Still further, the cabinet functionally substitutes for the dissipator for cooling, whereby the device can be reduced in weight. Also, since the cabinet is high in cooling efficiency due to its natural dissipation, the motor of the cooling fan 17 can be reduced in speed for cooling. Therefore, the portable information processing apparatus, which is low in power consumption and noise, can be implemented.

A portable information processing apparatus of the present invention is made of metal superior in heat conductivity, and includes a cabinet whose upper part on the outer surface is recessed, a keyboard placed in the recess in such manner as to be aligned with a palm rest, which is the lower part on the outer surface of the cabinet, and a circuit board having a heat-generating component mounted thereon. The circuit board is placed beneath the recess of the cabinet so that the heat-generating component thereon is in contact with the cabinet in a rather upper position via a spacer high in conductivity. In the recess of the cabinet 20, a plurality of through holes are formed in a part lower than the part where the heat-generating component is in contact.

Moreover, the palm rest is thickly coated with a coating including hollow spheres.

With the above configuration, the entire cabinet can work as a dissipator, and thus the amount of heat to be dissipated therefrom can be increased. As to the temperature at the palm rest on which the user puts his/her hands, the through holes obstruct heat conduction from the heat-generating component, and thus suppress the amount of heat to be conducted to the palm rest. The thick coating of hollow spheres also suppresses the heat conduction from the cabinet to the palm rest, and thus the palm rest may not feel so hot to the user.

While the invention has been described in detail, the foregoing description is in all aspects illustrative and not restrictive. It is understood that numerous other modifications and variations can be devised without departing from the scope of the invention.

What is claimed is:

1. A portable information processing apparatus in which heat conduction from a high-temperature heat-generating component in a cabinet to a palm rest, which is a surface of the cabinet, is restricted so that the palm rest is controlled in temperature, the apparatus comprising:

a heat conducting member provided over said heat-generating component to conduct heat thereof;

a heat absorption area, which is a part of said cabinet, arranged to absorb the heat of said heat-generating component through said heat conducting member;

wherein a heat conduction obstructing area is provided on a heat conduction path between said heat absorption area and said palm rest to reduce a cross-sectional area of the heat conduction path; and wherein an outer surface of said palm rest is subjected to heat insulation.

2. The portable information processing apparatus as claimed in claim 1, wherein said cabinet is made of lightweight metal superior in heat conductivity and strength.

3. The portable information processing apparatus as claimed in claim 1, wherein a cooling fan is provided beneath said heat absorption area in an upper position of said cabinet, and dissipates the heat from the heat absorption area to outside of the cabinet.

4. The portable information processing apparatus as claimed in claim 1, wherein the heat blocked by said heat conduction obstructing area on the way to said palm rest is dissipated from surroundings of the heat conduction obstructing area.

5. The portable information processing apparatus as claimed in claim 1, wherein said heat insulation is a thick coating including hollow spheres.

6. The portable information processing apparatus as claimed in claim 5, wherein said heat insulation is a film made of resin.

7. The portable information processing apparatus as claimed in claim 2, wherein said lightweight metal is selected from a lightweight metal group typically including aluminum and magnesium.

8. The portable information processing apparatus as claimed in claim 1, wherein said heat conduction obstructing area has one or more through holes made on said heat conduction path.

9. The portable information processing apparatus as claimed in claim 1, wherein a cross-sectional area of said heat conduction obstructing area is smaller in size than that of said heat conduction area and said palm rest.

* * * * *